United States Patent
Yamaguchi et al.

(10) Patent No.: US 8,421,294 B2
(45) Date of Patent: Apr. 16, 2013

(54) ROTARY ELECTRIC MACHINE INCLUDING AUXILIARY SLOT WITH CENTER OPPOSED TO SPECIFIED ROTOR PORTION

(75) Inventors: Shinichi Yamaguchi, Tokyo (JP); Hisashi Otsuka, Tokyo (JE); Haruyuki Hasegawa, Tokyo (JP)

(73) Assignee: Mitsubishi Electric Corporation, Tokyo (JP)

(*) Notice: Subject to any disclaimer, the term of this patent is extended or adjusted under 35 U.S.C. 154(b) by 178 days.

(21) Appl. No.: 12/810,526

(22) PCT Filed: Dec. 1, 2008

(86) PCT No.: PCT/JP2008/003538
§ 371 (c)(1), (2), (4) Date: Jun. 25, 2010

(87) PCT Pub. No.: WO2009/084151
PCT Pub. Date: Jul. 9, 2009

(65) Prior Publication Data
US 2010/0277026 A1    Nov. 4, 2010

(30) Foreign Application Priority Data
Dec. 28, 2007    (JP) ................................ 2007-339679

(51) Int. Cl.
*H02K 21/12*    (2006.01)
*H02K 1/06*    (2006.01)

(52) U.S. Cl.
USPC ............ 310/156.47; 310/156.08; 310/156.53; 310/216.069; 310/216.092

(58) Field of Classification Search ............ 310/156.47, 310/156.25, 216.071, 216.087, 216.073, 310/216.074, 216.076, 216.077, 216.092, 310/216.093, 216.094, 216.097, 216.106, 310/216.108; *H02K 1/14*
See application file for complete search history.

(56) References Cited

U.S. PATENT DOCUMENTS 5,523,637 A * 6/1996 Miller ...................... 310/156.47
5,773,908 A * 6/1998 Stephens et al. ....... 310/216.094
(Continued)

FOREIGN PATENT DOCUMENTS

| CN | 1551462 A | 12/2004 |
| JP | 2000 308286 | 11/2000 |

(Continued)

OTHER PUBLICATIONS

JPO Machine Translation, JP 2006-230116, Permanent Magnet Motor and Manufacturing Method Thereof, Feb. 23, 2012, http://dossier.ipdl.inpit.go.jp/text_trans.html.*

(Continued)

*Primary Examiner* — Tran N. Nguyen
*Assistant Examiner* — Thomas Truong
(74) *Attorney, Agent, or Firm* — Oblon, Spivak, McClelland, Maier & Neustadt, L.L.P.

(57) ABSTRACT

A rotor includes permanent magnets arranged such that magnetic poles of N poles and S poles are arranged alternately in a rotation circumferential direction. The permanent magnets form a plurality of rows in a rotation axis direction. The rotor includes a change section in which arrangements of the magnetic poles change with respect to the rotation axis direction due to the permanent magnets being arranged such that arrangements of the magnetic poles change, in the rotation circumferential direction, between the permanent magnets in the plurality of rows. A stator includes tooth sections opposed to the rotor to surround the rotor, and auxiliary slots each of which is selectively formed at one portion of a front end portion of each tooth section in the rotation axis direction such that substantially a center of the auxiliary slot in the rotation axis direction is opposed to the change section.

13 Claims, 10 Drawing Sheets

U.S. PATENT DOCUMENTS

| | | | |
|---|---|---|---|
| 6,876,115 B2 | 4/2005 | Takahashi et al. | |
| 7,067,948 B2 | 6/2006 | Yamaguchi et al. | |
| 7,196,445 B2 | 3/2007 | Yamaguchi et al. | |
| 7,906,880 B2 * | 3/2011 | Okubo et al. | 310/156.25 |
| 2003/0230947 A1 * | 12/2003 | Islam et al. | 310/156.47 |
| 2010/0201210 A1 | 8/2010 | Nakayama et al. | |
| 2012/0139372 A1 * | 6/2012 | Nakano et al. | 310/83 |

FOREIGN PATENT DOCUMENTS

| | | |
|---|---|---|
| JP | 2001025182 A * | 1/2001 |
| JP | 2001 231196 | 8/2001 |
| JP | 2004-159492 | 6/2004 |
| JP | 2004-180491 | 6/2004 |
| JP | 2004 248422 | 9/2004 |
| JP | 2006 230116 | 8/2006 |

OTHER PUBLICATIONS

JPO Machine Translation, JP 2001-231196, Permanent Magnet Rotor and Its Magnetizing Method, Feb. 23, 2012, http://dossier.ipdl.inpit.go.jp/text_trans.html.*

* cited by examiner

ROTARY ELECTRIC MACHINE INCLUDING AUXILIARY SLOT WITH CENTER OPPOSED TO SPECIFIED ROTOR PORTION

TECHNICAL FIELD

The present invention relates to a rotary electric machine including a permanent magnet, and particularly to a rotary electric machine including a rotor having a skew structure.

BACKGROUND ART

Figure 18:
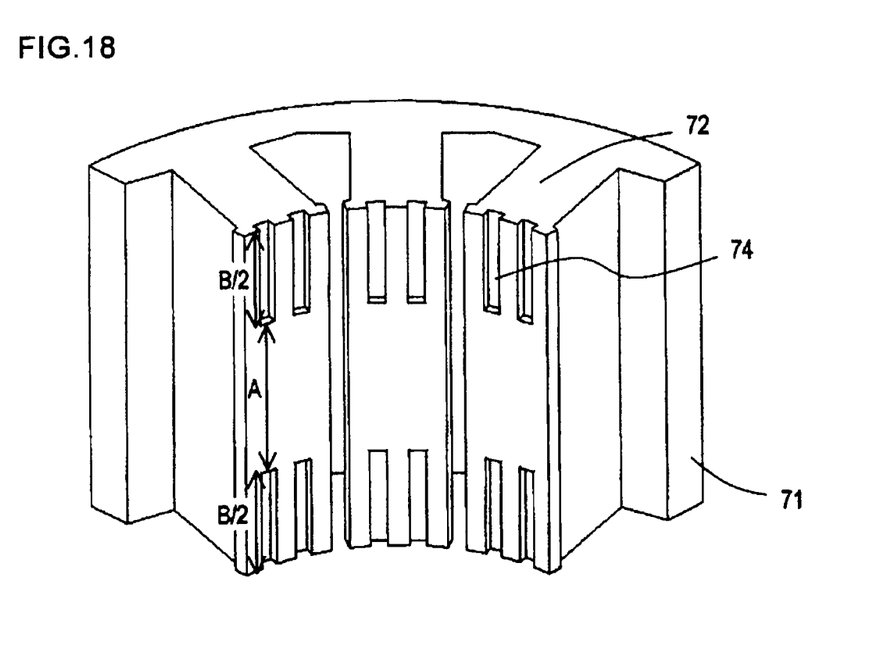
FIG. 18 schematically shows a sectional view of a conventional rotary electric machine as sectioned in a direction perpendicular to a rotation axis thereof.

FIG. 18 schematically shows a sectional view of a conventional general rotary electric machine (called a "permanent magnet type synchronous motor" or a "permanent magnet type motor") as sectioned in a direction perpendicular to a rotation axis thereof.

As shown in FIG. 18, the rotary electric machine has a stator 70 and a rotor 80, and the rotor 80 is arranged inside the stator 70.

The stator 70 has a stator iron core 71 and stator windings 76. The stator iron core 71 is formed of, for example, a plurality of electromagnetic steel plates being laminated in a rotation axis direction, or an iron dust core. The stator iron core 71 has a plurality of tooth sections 72 each having a front end portion which faces the rotor 80. The winding 76 is wound on the tooth section 72, and the tooth section 72 serves as a magnetic pole.

The rotor 80 has a rotor iron core 81 and a plurality of permanent magnets 82. The permanent magnets 82 of FIG. 18 are embedded in the interior of the rotor iron core 81. Alternatively, there is also known a configuration in which a segment-shaped permanent magnet or a ring-shaped permanent magnet is attached to a rotor iron core. The rotary electric machine generates a rotation torque around a rotation axis 90 by means of interaction between a rotation magnetic field generated by the stator 70 and magnetomotive force generated by the permanent magnets 82 of the rotor 80.

The rotary electric machine using the permanent magnet is advantageous in that a high torque is generated even if the rotary electric machine has a small size, but on the other hand involves a problem that a pulsating torque occurs due to interaction between magnetic fluxes of the permanent magnets 82 and the tooth sections 72 of the stator 70. Particularly, a pulsating torque under an unloaded state is called a cogging torque, and may cause deterioration in a positioning accuracy, a vibration, a noise, and the like. In an interior magnet type rotary electric machine having a permanent magnet embedded in the inside of a rotor, there is a problem that the cogging torque is particularly high.

Accordingly, in order to reduce the cogging torque, a technique of using a rotor having a skew structure, providing auxiliary slots in the tooth sections of the stator, or the like, has been developed. The applicant of the present application discloses in Patent Document 1 that a cogging torque can be reduced by providing auxiliary slots extending in a rotation axis direction in tooth sections of a stator and changing the width of the auxiliary slots in the rotation axis direction. Disclosed in Patent Document 1 is a configuration having a combination of a stator with the auxiliary slots and a rotor with a skew structure.

Additionally, a technique of using a rotor having a pseudo skew structure is disclosed in Patent Document 2, for example.

Patent Document 1: Japanese Laid-Open Patent Publication No. 2006-230116

Patent Document 2: Japanese Laid-Open Patent Publication No. 2001-231196

DISCLOSURE OF THE INVENTION

Problems to be Solved by the Invention

However, the inventors of the present invention have examined in detail a configuration having a combination of a stator with an auxiliary slot and a rotor with a skew structure, and found that the configuration disclosed in the conventional example cannot sufficiently reduce a cogging torque, as will be described in detail later.

The present invention is made to solve the above problem, and a main object of the present invention is to reduce a cogging torque of a rotary electric machine including a rotor with a skew structure.

Solution to the Problems

A rotary electric machine of the present invention includes: a rotor including a plurality of permanent magnets having magnetic poles, in a circumferential direction of a rotor iron core; and a stator including a plurality of tooth sections each having a front end portion which faces the rotor. The rotor has a skew structure having a change section in which boundaries between the magnetic poles change with respect to a rotation axis direction. The front end portion of each of the plurality of tooth sections of the stator has an auxiliary slot which is selectively formed in an extending manner at one portion of the front end portion in the rotation axis direction such that substantially a center of the auxiliary slot in the rotation axis direction is opposed to a center of the change section in the rotation axis direction, and no auxiliary slot is formed at portions located on extensions of the auxiliary slot in the rotation axis direction.

EFFECT OF THE INVENTION

The present invention can reduce a cogging torque of a rotary electric machine using a rotor with a skew structure.

BEST MODE FOR CARRYING OUT THE INVENTION

Hereinafter, rotary electric machines according to embodiments of the present invention will be described in detail with reference to the drawings. It is to be noted that embodiments of the present invention are not limited to the embodiments illustrated below.

Embodiment 1

Figure 1:
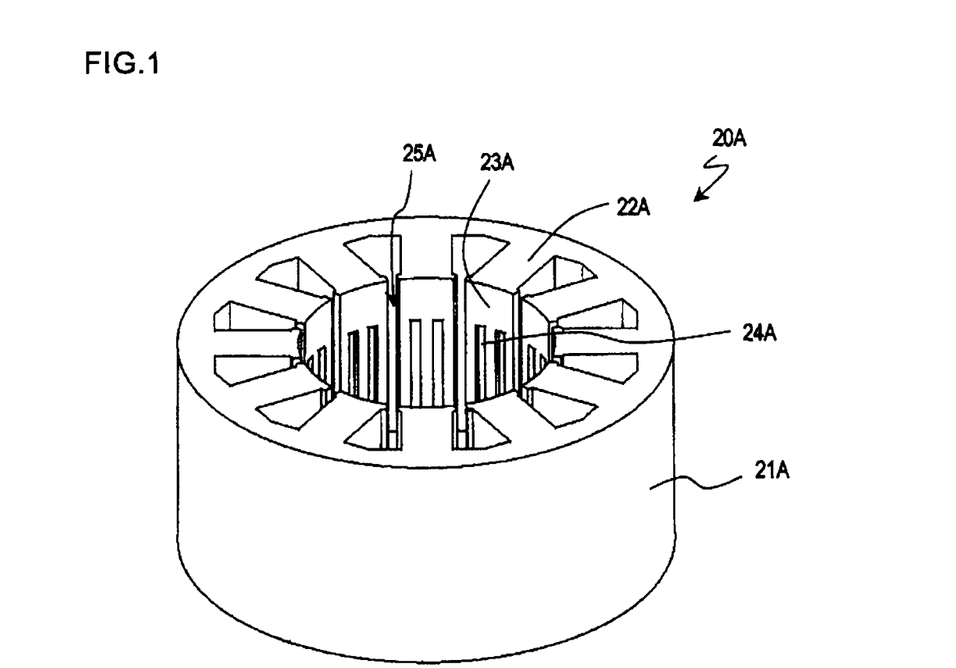
FIG. 1 schematically shows a perspective view of a stator of a rotary electric machine according to Embodiment 1 of the present invention.
Figure 2:
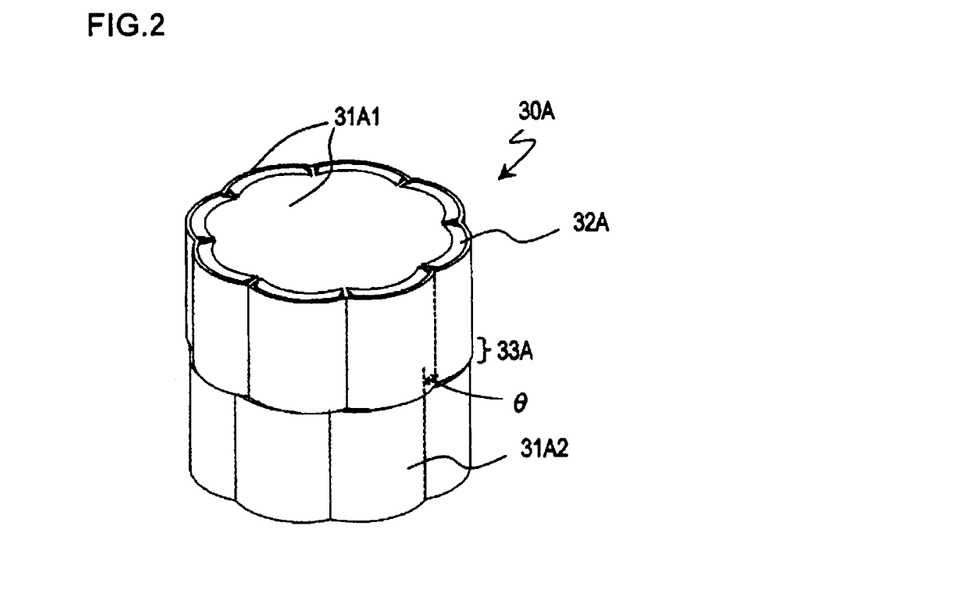
FIG. 2 schematically shows a perspective view of a rotor of the rotary electric machine according to Embodiment 1 of the present invention.
Figure 3:
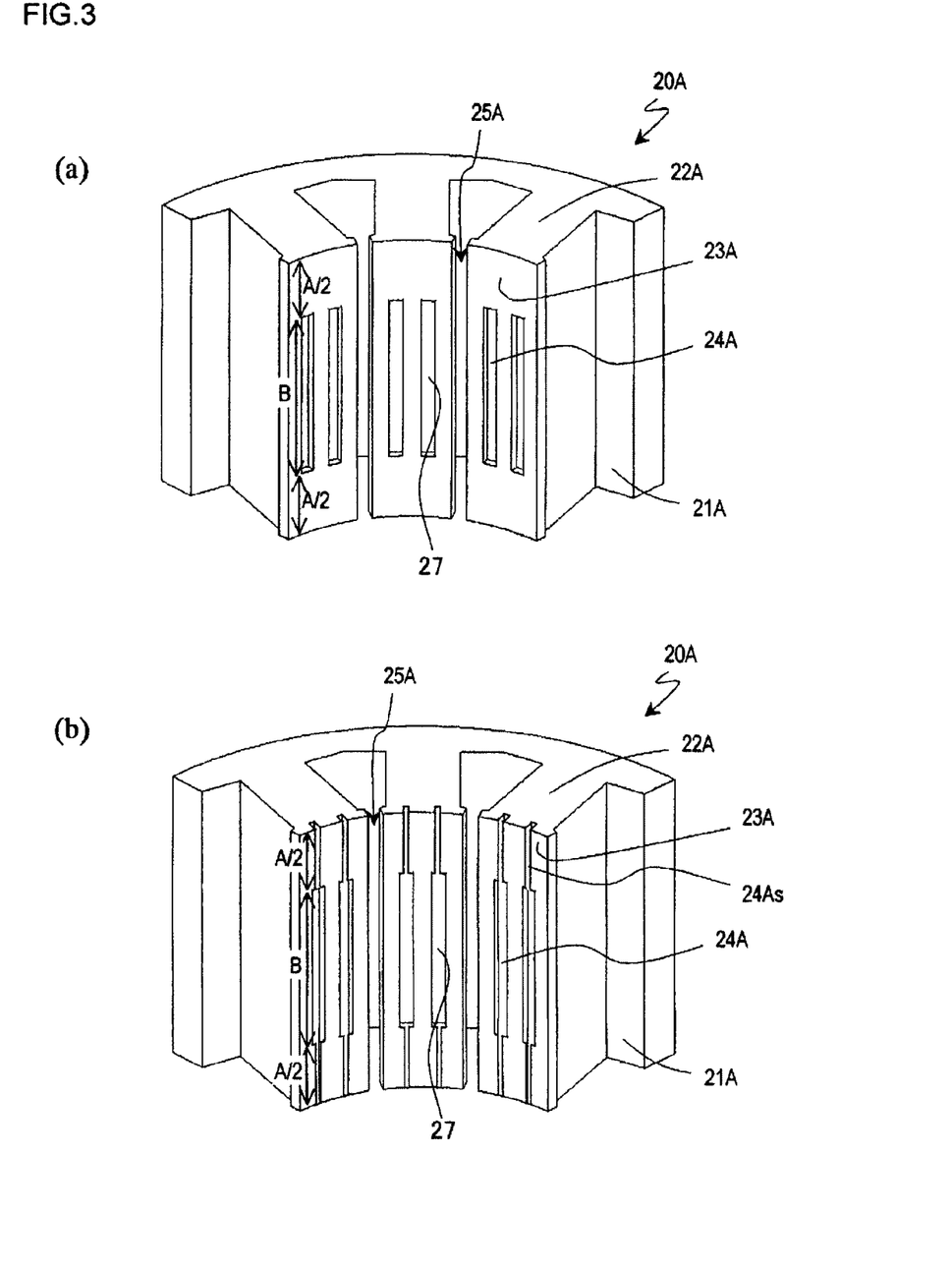
FIG. 3 shows enlarged perspective views of a part of the stator of the rotary electric machine according to Embodiment 1 of the present invention.

A rotary electric machine according to Embodiment 1 of the present invention has a stator 20A of which a schematic perspective view is shown in FIG. 1, and a rotor 30A of which a schematic perspective view is shown in FIG. 2. The rotor 30A is rotatably arranged inside the stator 20A. FIG. 3(a) shows a perspective view enlarging only a part of the stator 20A having three tooth sections. FIG. 3(b) shows a modified example of the stator 20A of FIG. 3(a). In FIGS. 1 and 3, windings are omitted.

As shown in FIG. 1, the stator 20A includes twelve tooth sections 22A each having a front end portion 23A facing the rotor 30A which is arranged inside the stator 20A. The front end portion 23A of each tooth section 22A has at least one auxiliary slot 24A which is selectively disposed at one portion in a rotation axis direction and extends in the rotation axis direction. A configuration of the auxiliary slot 24A will be described in detail later. It is to be noted that, although the stator 20A of the present example is formed with a plurality of electromagnetic steel plates laminated in the rotation axis direction, the stator may be formed of an iron dust core or the like.

As shown in FIG. 2, the rotor 30A has two upper and lower rotor iron cores 31A1 and 31A2 being stacked on each other. Each of the rotor iron cores 31A1 and 31A2A has a plurality of permanent magnets 32A embedded near the outer circumference thereof. In each of the rotor iron cores 31A1 and 31A2, eight permanent magnets 32A are embedded such that N-poles and S-poles alternate with each other in a rotor circumferential direction. The number of magnetic poles in the rotor 30A is eight. It is to be noted that, although each of the rotor iron cores 31A1 and 31A2 is formed of laminated electromagnetic steel plates or the like, the rotor iron core may be formed of an iron dust core or the like.

As shown in FIG. 2, the rotor iron cores 31A1 and 31A2 are arranged so as to be displaced by a predetermined angle θ in a rotor circumferential direction. In this manner, a structure in which the magnets 32A attached to the rotor iron cores 31A1 and 31A2 are arranged so as to be discontinuous in the rotation axis direction, is herein referred to as a "row-to-row skew structure". The row-to-row skew structure of the rotor 30A has a discontinuous change section 33A in which the boundaries between the magnetic poles of the magnets 32A provided in the rotor iron core 31A1 and the boundaries between the magnetic poles of the magnets 32A provided in the rotor iron core 31A2 are displaced from each other by the predetermined angle (hereinafter referred to as a row-to-row skew angle)θ.

The position, in the rotation axis direction, of the auxiliary slot 24A provided in the front end portion 23A of the tooth section 22A of the stator 20A corresponds to the row-to-row skew structure of the rotor 30A shown in FIG. 2. The rotor 30A has the change section 33A in which the boundaries between the magnetic poles discontinuously change in the rotation axis direction. Each auxiliary slot 24A is selectively provided at one portion in the rotation axis direction such that substantially the center 27 of the auxiliary slot 24A in the rotation axis direction is opposed to the center of the change section 33A in the rotation axis direction. No auxiliary slot is formed at other portions located on extensions of the auxiliary slot 24A in the rotation axis direction.

The number m of the magnetic poles included in the rotor 30A of the rotary electric machine of the present example is eight, and the number n of the tooth sections 22A included in the stator 20A is twelve. In this condition, a row-to-row skew angle θ (see FIG. 2) of the row-to-row skew structure is 7.5° based on the theoretical formula of θ=[{360°/24 (the least common multiple of m and n)}/2 (the number of rows of the permanent magnets)]. Thus, the row-to-row skew angle θ is set to be 7.5°. The skew angle of the rotary electric machine having the row-to-row skew structure is not limited to 7.5° as obtained in theory in the above-described manner, but preferably is equal to or larger than 7.5° which is the value resulting from [360°/24 (the least common multiple of m and n)]/2. This is based on consideration of the fact that, when magnetic flux leakage in the rotation axis direction cannot be sufficiently reduced in the rotary electric machine having the row-to-row skew structure, the skew angle becomes larger than a theoretical angle. On this point, the inventors have proposed that the lower limit value of a row-to-row skew angle θe should be set at a value larger than a theoretical angle θs obtained by the above theoretical formula, and the upper limit value of the row-to-row skew angle θe should be set at a maximum value of the row-to-row skew angle θe in a range where the cogging torque ratio is equal to or lower than a cogging torque ratio at the theoretical angle θs which is obtained in accordance with magnetic flux density-magnetizing force characteristics of the stator iron core, from a relation between the row-to-row skew angle θe and a cogging torque ratio which is represented by a ratio of a cogging torque in a case where a row-to-row skew is provided to a cogging torque in a case where a row-to-row skew is not provided (see Japanese Laid-Open Patent Publication No. 2004-159492).

The configuration of the auxiliary slots 24A of the stator 20A will be described in more detail with reference to FIGS. 3(a) and 3(b).

As shown in FIG. 3(a), in each tooth section 22A, two auxiliary slots 24A are formed in the front end portion 23A in the circumferential direction. In more detail, the two auxiliary slots 24A are formed in each front end portion 23A so as to trisect in the circumferential direction an area between two neighboring slot openings 25A. Providing the two auxiliary slots 24A in this manner can reduce a second harmonic component of the cogging torque, which is a pulsating component having a frequency twice as high as a frequency of a fundamental wave component of the cogging torque.

The auxiliary slots 24A are arranged such that substantially the center thereof in the rotation axis direction is opposed to the axial center (boundary) of the change section 33A of the rotor 30A. In designing, the auxiliary slots 24A are provided such that substantially the center thereof in the rotation axis direction is opposed to the boundary between the two rows of the row-to-row skew structure, but displacement in assembly is allowed. When the auxiliary slots 24A are provided, a gap between the stator 20A and the rotor 30A increases in the auxiliary slots 24A, to increase magnetoresistance. As a result, magnetic flux leakage in the rotation axis direction, which is caused due to the row-to-row skew structure, can be reduced, and the effect of reducing the fundamental wave component of the cogging torque, which is obtained due to the row-to-row skew structure, can be sufficiently exerted.

Moreover, the second harmonic component of the cogging torque can be reduced by optimizing the length of the auxiliary slot 24A in the rotation axis direction. Here, the ratio between the length A of a portion of the iron core having no auxiliary slot in the rotation axis direction and the length B of a portion of the iron core having the auxiliary slot in the rotation axis direction is set at 1.0:1.3. As shown in FIG. 3(a), the auxiliary slots 29A illustrated herein are formed symmetrically with respect to the center of the rotation axis direction.

The stator 20A shown in FIG. 3(a) has only the auxiliary slots 29A extending in the rotation axis direction, which are each selectively provided at one portion in the rotation axis direction such that substantially the center of the auxiliary slots 24A in the rotation axis direction is opposed to the center of the change section (the change section 33A in FIG. 2) of the row-to-row skew structure in the rotation axis direction. No auxiliary slot is provided at other portions in the rotation axis direction. As shown in FIG. 3(b), auxiliary slots 24As having a smaller width than that of the auxiliary slots 24A may be provided at other portions in the rotation axis direction. However, since a torque to be obtained is reduced when the auxiliary slots 24As having a smaller width are provided, the structure shown in FIG. 3(a) is preferred.

Figure 16:
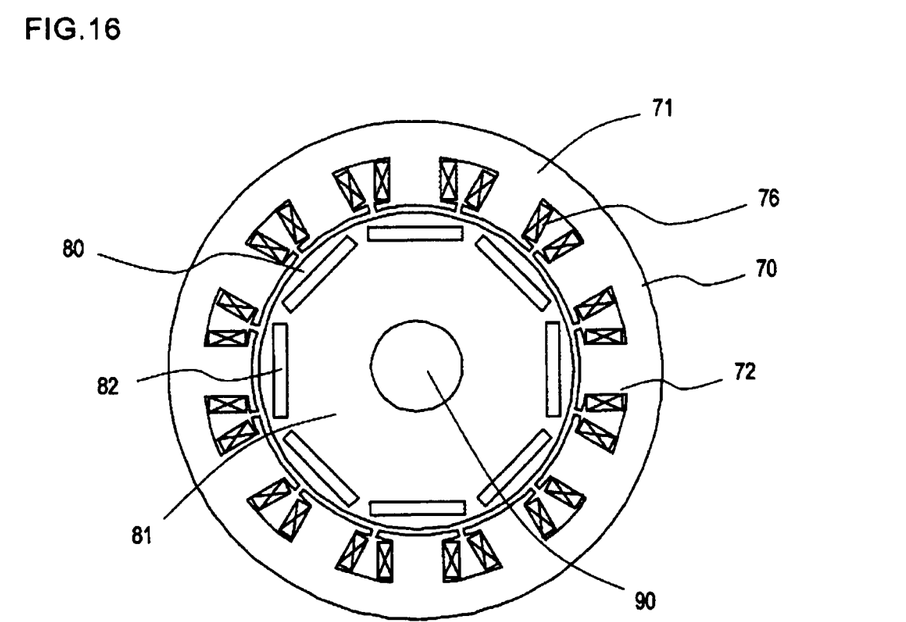
FIG. 16 schematically shows a perspective view of a stator of a rotary electric machine according to a reference example to be compared with an example of the present invention.
Figure 17:
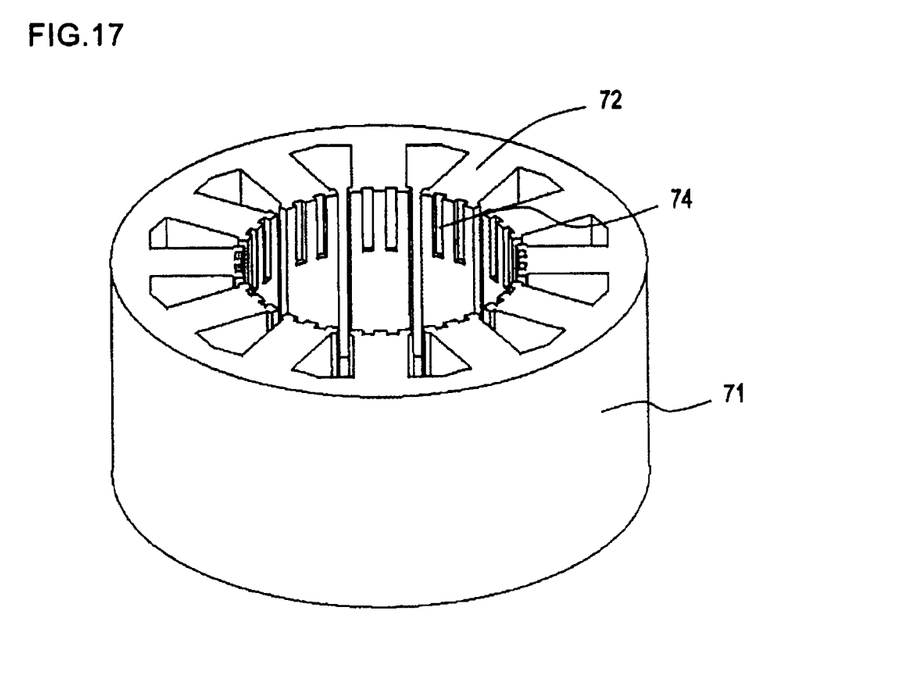
FIG. 17 is an enlarged view of the stator of the rotary electric machine according to the reference example to be compared with the example of the present invention.

Next, by comparing the example of the present invention (FIGS. 1, 2, and 3(a)) and a reference example shown in FIGS. 16 and 17, the effect of reducing the cogging torque in the example of the present invention will be described.

The example of the present invention to be compared herein is the rotary electric machine having the rotor 30A shown in FIG. 2 arranged inside the stator 20A shown in FIG. 1. In the stator 20A, the auxiliary slots 24A shown in FIG. 3(a) are disposed at the central portion of the stator 20A in the rotation axis direction. The ratio between the axial length A of the portion of the iron core having no auxiliary slot and the axial length B of the portion of the iron core having the auxiliary slot is set at 1.0:1.0. On the other hand, a rotary electric machine in the reference example has the rotor 30A shown in FIG. 2 arranged inside a stator iron core 71 shown in FIGS. 16 and 17. FIG. 16 shows a perspective view of the stator iron core 71 of the reference example, and FIG. 17 shows an enlarged view of the stator iron core 71 of the reference example. As shown in FIGS. 16 and 17, in the stator iron core 71 of the reference example, auxiliary slots 74 are arranged at upper and lower end portions of the front end portion of the tooth section 72 in the rotation axis direction, and no auxiliary slot is arranged at a central portion thereof. The ratio between the axial length A of a portion of the iron core having no auxiliary slot and the axial length B of a portion of the iron core having the auxiliary slot is set at 1.0:1.0.

Figure 4:
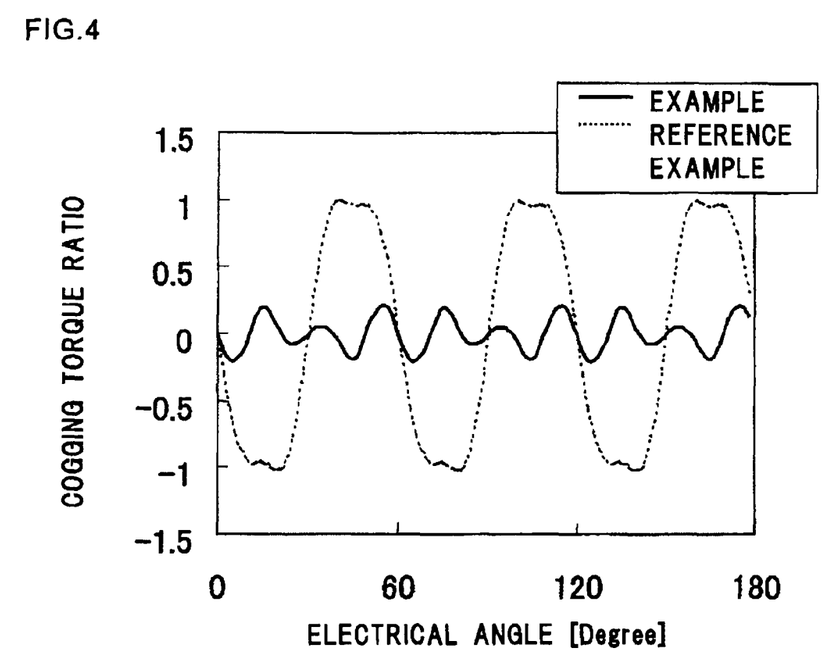
FIG. 4 is a graph showing a result of a three-dimensional simulation of cogging torque waveforms according to an example of the present invention and a reference example, respectively.

A simulation was performed by a three-dimensional magnetic field analysis, to calculate cogging torque waveforms obtained from the rotary electric machine of the example of the present invention and the rotary electric machine of the reference example. The result of the calculation is shown in FIG. 4. In FIG. 4, the horizontal axis represents the electrical angle, and the vertical axis represents the cogging torque ratio. However, the cogging torque ratio represented by the vertical axis is based on a value of the cogging torque amplitude of the rotary electric machine of the reference example. In FIG. 4, the solid line indicates the cogging torque ratio of the example of the present invention, and the dotted line indicates the cogging torque ratio of the reference example. It is found that the cogging torque can be considerably reduced by applying the structure of the present invention.

Next, in order to examine the example of the present invention and the reference example in more detail, a three-dimensional simulation was performed concerning a relation between the cogging torque and the ratio (hereinafter referred to as a "lamination ratio") between the axial length A of the portion of the iron core having no auxiliary slot and the axial length B of the portion of the iron core having the auxiliary slot. A large difference between the reference example and the example of the present invention is that, in the reference example, the axial length B of the portion of the iron core having the auxiliary slot is divided into the axially upper and lower end portions, whereas in the example of the present invention, the axial length B of the portion of the iron core having the auxiliary slot is positioned at the axially central portion.

Figure 5:
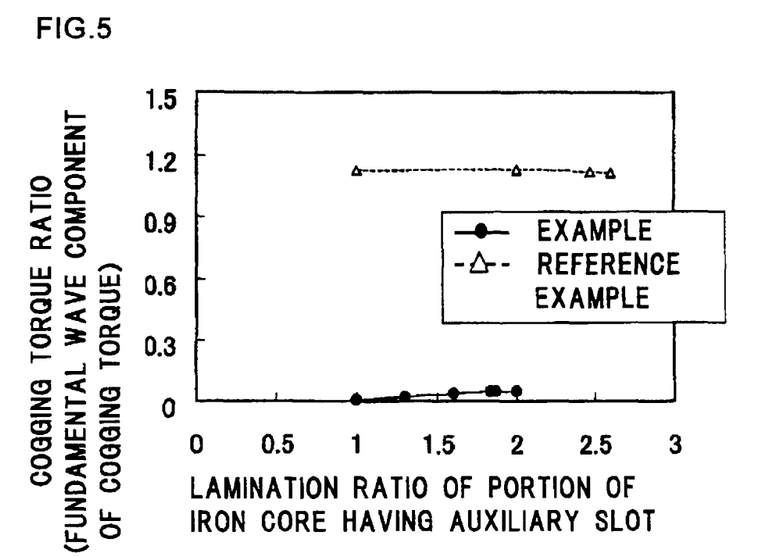
FIG. 5 is a graph showing a simulation result concerning the magnitude of a fundamental wave component of a cogging torque in a case where a ratio (lamination ratio) between an axial length A of a portion of an iron core having no auxiliary slot and an axial length B of a portion of the iron core having an auxiliary slot is changed.
Figure 6:
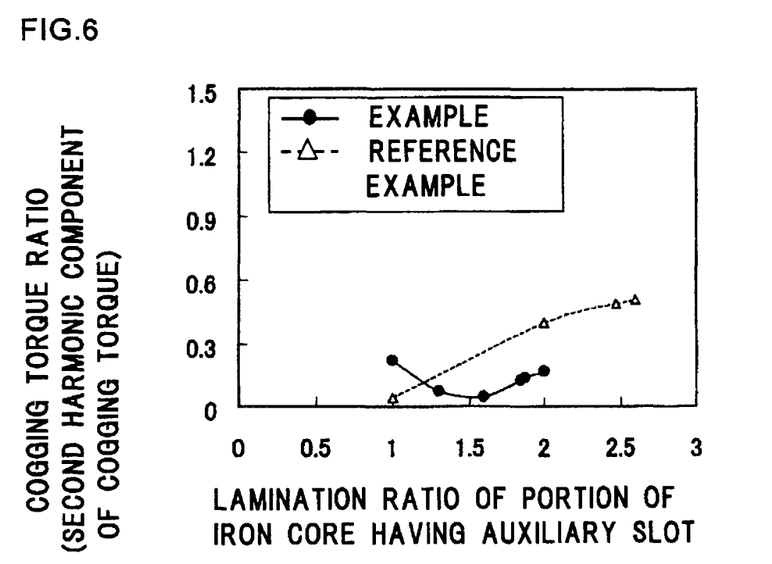
FIG. 6 is a graph showing a simulation result concerning the magnitude of a second harmonic component of the cogging torque in the case where the ratio (lamination ratio) between the axial length A of the portion of the iron core having no auxiliary slot and the axial length B of the portion of the iron core having the auxiliary slot is changed.
Figure 7:
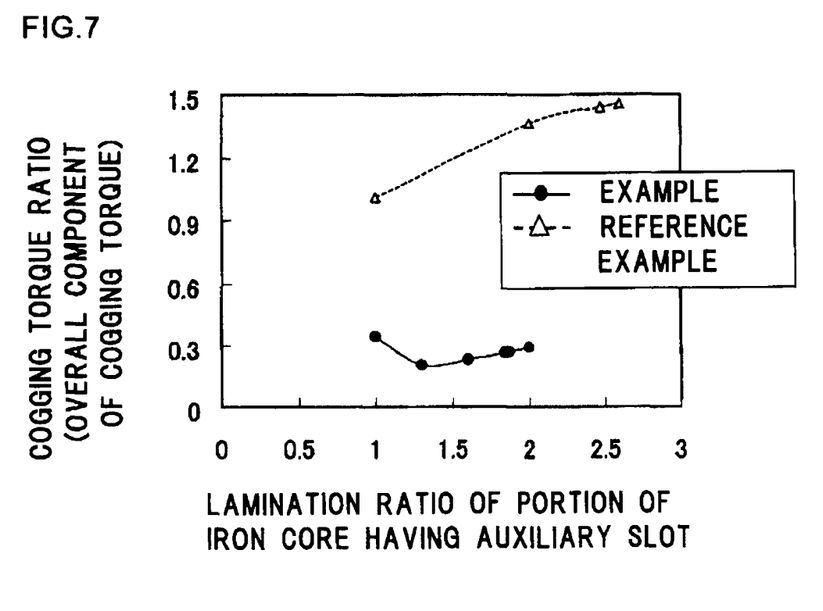
FIG. 7 is a graph showing a simulation result concerning the magnitude of an overall component of the cogging torque in the case where the ratio (lamination ratio) between the axial length A of the portion of the iron core having no auxiliary slot and the axial length B of the portion of the iron core having the auxiliary slot is changed.

FIGS. 5, 6, and 7 show analysis results in a case where the lamination ratio between the portion of the stator iron core having the auxiliary slot and the portion of the stator iron core having no auxiliary slot is changed in each of the example of the present invention and the reference example. FIG. 5 shows a relation between the fundamental wave component of the cogging torque and the lamination ratio of the portion of the iron core having the auxiliary slot when the portion of the iron core having no auxiliary slot is defined as 1.0. FIG. 6 shows a relation between the second harmonic component of the cogging torque and the lamination ratio of the portion of the iron core having the auxiliary slot when the portion of the iron core having no auxiliary slot is defined as 1.0. FIG. 7 shows a relation between the overall component (from the maximum value to the minimum value) of the cogging torque and the lamination ratio of the portion of the iron core having the auxiliary slot when the portion of the iron core having no auxiliary slot is defined as 1.0. In FIGS. 5 to 7, similarly to in FIG. 4, the vertical axis represents a ratio based on a value of the cogging torque amplitude of the reference example.

From FIG. 5, it is found that the fundamental wave component of the cogging torque is sufficiently reduced by applying the example of the present invention. This is considered to be because, since the auxiliary slots 24A are provided at the portions opposed to the center of the change section (the change section 33A of FIG. 2) of the row-to-row skew structure in the rotation axis direction, magnetic flux leakage in the rotation axis direction which is caused due to the row-to-row skew structure can be reduced. On the other hand, it is found that, in the reference example, magnetic flux leakage in the axial direction, which occurs inside the stator due to the influence of the row-to-row skew structure, cannot be reduced and therefore the fundamental wave component of the cogging torque cannot be reduced even though the lamination ratio is changed. Thus, in order to reduce the fundamental wave component of the cogging torque, it is effective to, as in the stator 20A shown in FIGS. 1 and 3, provide auxiliary slots in the front end portions 23A of the stator tooth sections 22A such that substantially the center of the auxiliary slots in the rotation axis direction is opposed to the center of the change section of the row-to-row skew structure in the rotation axis direction.

On the other hand, as seen from FIG. 6, the second harmonic component of the cogging torque can be minimized by changing the lamination ratio in the stator iron core. That is, the second harmonic component of the cogging torque can be reduced by optimizing the ratio (lamination ratio) between the axial length A of the portion of the iron core having no auxiliary slot and the axial length B of the portion of the iron core having the auxiliary slot. From FIG. 6, it is found that, in the example of the present invention, the second harmonic component of the cogging torque can be reduced by setting the lamination ratio A:B at 1:1.5.

The overall value of the cogging torque shown in FIG. 7 is determined by the vector sum of the fundamental wave component and the second harmonic component of the cogging torque. Thus, the optimum lamination ratio A:B is considered to be approximately 1:1.3.

When the auxiliary slots 74 are arranged at the end portions of the front end portions of the tooth sections 72 in the rotation axis direction as in the reference example, the amount of the magnetic flux leakage at the end portions in the rotation axis direction increases, which leads to reduction in the torque. On the other hand, by adopting the configuration as shown in FIG. 3(*a*) in which the auxiliary slots 24A are provided only at the central portions in the rotation axis direction and no auxiliary slot is formed at other portions including the end portions, the magnetic flux leakage at the end portions in the rotation axis direction can be reduced, and a high torque output can be obtained.

Embodiment 2

Next, a rotary electric machine according to Embodiment 2 of the present invention will be described with reference to FIGS. 8 to 10.

Figure 8:
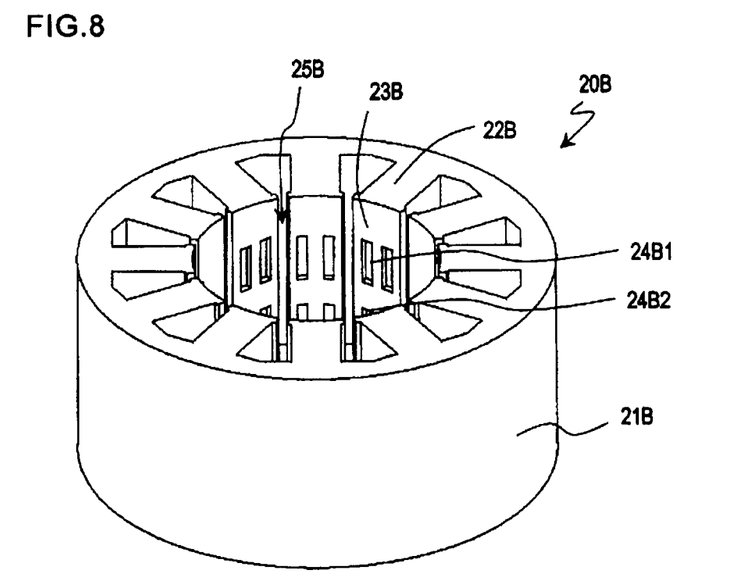
FIG. 8 schematically shows a perspective view of a stator of a rotary electric machine according to Embodiment 2 of the present invention.
Figure 9:
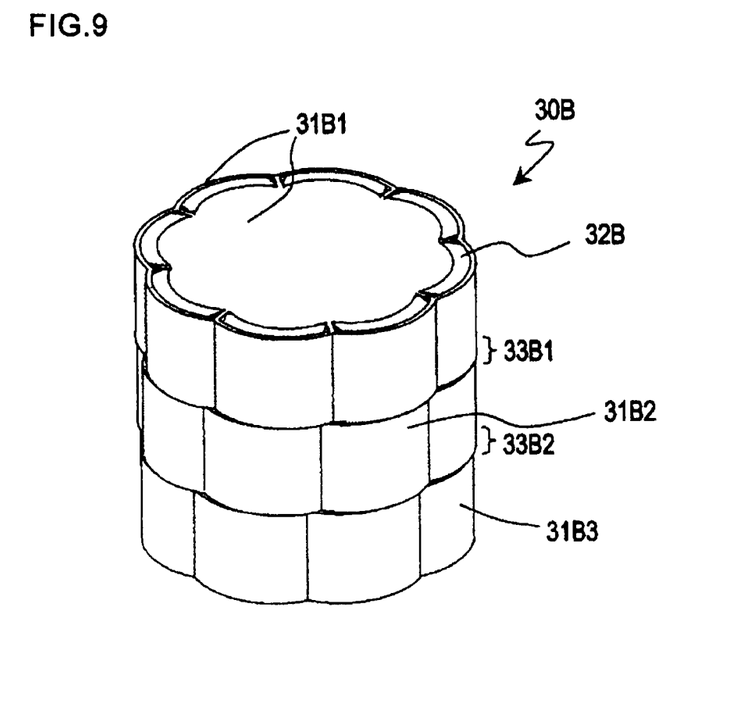
FIG. 9 schematically shows a perspective view of a rotor of the rotary electric machine according to Embodiment 2 of the present invention.

The rotary electric machine according to Embodiment 2 has a stator 20B of which a schematic perspective view is shown in FIG. 8, and a rotor 30B of which a schematic perspective view is shown in FIG. 9. The rotor 30B is rotatably arranged inside the stator 20B. FIG. 10 shows a perspective view enlarging only a part of the stator 20B having three tooth sections. In FIGS. 8 and 10, windings are omitted.

In the present embodiment, the rotor 30B has a three-rows skew structure which is divided into three parts in the rotation axis direction. The rotor 30B has two change sections 33B1 and 33B2. The row-to-row skew angle θ of the three-rows skew structure is 5°, based on the above-described theoretical formula of θ=[{360°/24 (the least common multiple of m and n)}/3 (the number of rows of the permanent magnets)]. Thus, the row-to-row skew angle θ is set at 5°.

Figure 10:
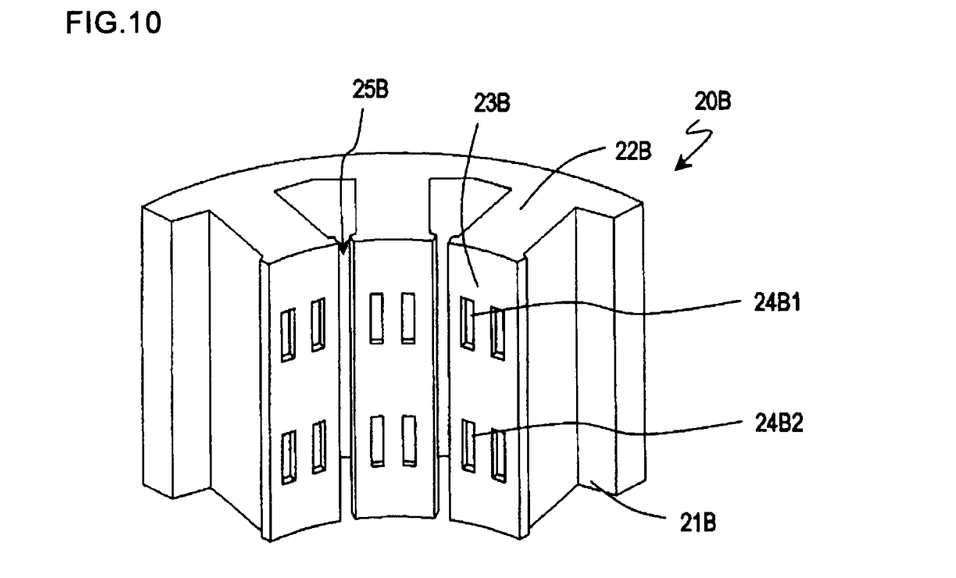
FIG. 10 is an enlarged perspective view of a part of the stator of the rotary electric machine according to Embodiment 2 of the present invention.

As shown in FIG. 10, in the stator iron core 22B, auxiliary slots 24B1 and 24B2 are formed in a front end portion 23B of a stator tooth section 22B such that substantially the center of each of the auxiliary slots 24B1 and 24B2 in the rotation axis direction is respectively opposed to the center of each of the change sections 33B1 and 33B2 of the row-to-row skew structure in the rotation axis direction. In the present embodiment, similarly to in the foregoing embodiment, since the auxiliary slots 24B1 and 24B2 are provided, magnetic flux leakage in the rotation axis direction is reduced, and thus the fundamental wave component of the cogging torque is reduced.

Needless to say, the above-described example is not limitative. When three-or-more-rows skew structure is adopted, the cogging torque can also be reduced, if an auxiliary slot is provided in a front end portion of a tooth section of a stator such that substantially the center of the auxiliary slot in the rotation axis direction is opposed to the center of a change section of the row-to-row skew structure of a rotor in the rotation axis direction. Generally, the larger the number of rows of the row-to-row skew structure is, the more the effect of reducing the cogging torque increases.

As described above, in order to maximize the cogging torque reduction effect obtained by the adoption of the row-to-row skew structure, it is effective to provide an auxiliary slot in a front end portion of a tooth section of a stator such that the center of the auxiliary slot in the rotation axis direction is opposed to the center of a change section of a row-to-row skew structure of a rotor in the rotation axis direction, to thereby reduce magnetic flux leakage in the rotation axis direction which occurs inside a stator iron core. Since the magnetic flux leakage in the rotation axis direction which occurs inside the stator iron core becomes apparent when the rotary electric machine uses a strong magnet (high magnetism loaded), the present invention is particularly preferably used. For example, the present invention is particularly preferably used for a rotary electric machine utilizing a high magnetic flux density, in which the magnetic flux density of tooth sections is 1 T (tesla) or more. Here, the magnetic flux density of the tooth sections of the rotary electric machine assumed for use in the simulation is approximately 1.2 T.

Embodiment 3

The structure of the stator (stator iron core) of the rotary electric machine according to the present invention is not particularly limited to the above-described embodiments. For example, various known structures may be used, such as a divided iron core structure or a thin-wall coupled iron core structure.

Figure 11:
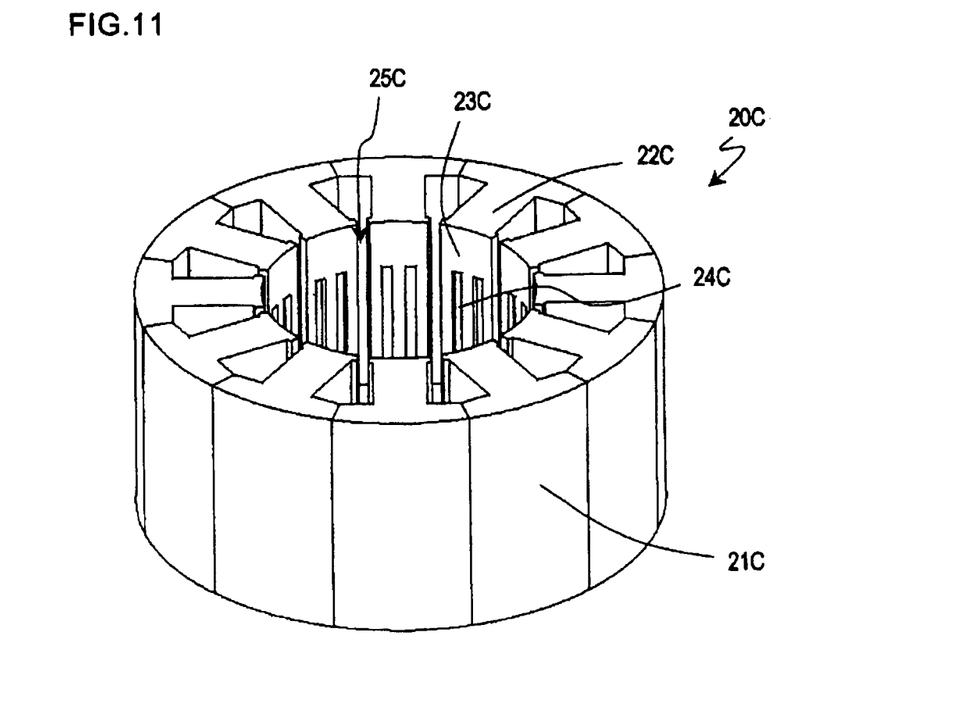
FIG. 11 schematically shows a perspective view of a stator of a rotary electric machine according to Embodiment 3 of the present invention.

For example, a stator 20C shown in FIG. 11 having an iron core 21C which is divided into parts including respective tooth sections 22C may be adopted instead of the stator 20A shown in FIG. 1. The stator 20C shown in FIG. 11 includes a plurality of (in the example, twelve) iron cores 21C each having a core back part 26C and a tooth section 22C having a front end portion 23C. The plurality of iron cores 21C are arranged annularly such that the neighboring core back parts 26C are in contact with each other. Here, auxiliary slots 24C are formed in the same manner as the auxiliary slots 24A of FIG. 1. In a stator in which iron cores divided into parts including respective tooth sections are annularly arranged in the same manner, core back parts may be partially coupled, though not shown.

In a rotary electric machine using a stator iron core of which core back parts are partially coupled (for example, see Japanese Laid-Open Patent Publication No. 11-220844 (Japanese Patent No. 3307888) or Japanese Laid-Open Patent Publication No. 2000-201458 (Japanese Patent No. 3279279)), magnetic characteristics of the core back parts deteriorate, and therefore magnetic flux leakage in the rotation axis direction occurs. Thus, by providing an auxiliary slot, the magnetic flux leakage in the rotation axis direction can be reduced to thereby reduce the cogging torque.

When an iron dust core is used as a stator iron core, magnetic flux leakage in the rotation axis direction occurs. Thus, by providing an auxiliary slot, the magnetic flux leakage in the rotation axis direction can be reduced to thereby reduce the cogging torque.

Embodiment 4.

Figure 12:
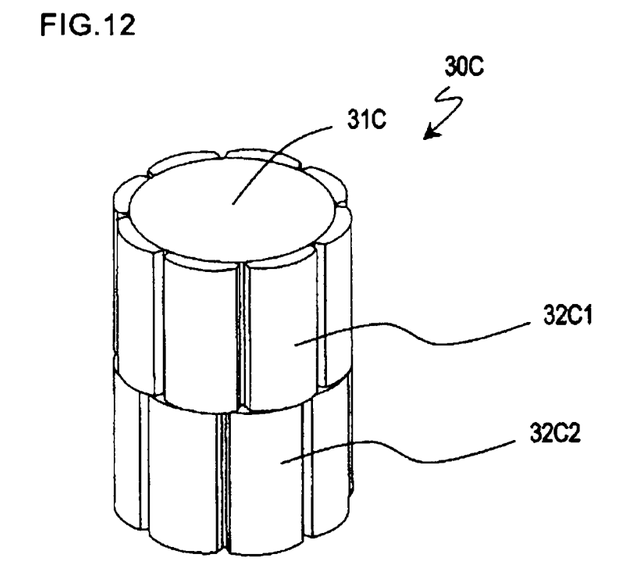
FIG. 12 schematically shows a perspective view of a rotor of a rotary electric machine according to Embodiment 4 of the present invention.

In the above-described embodiments, an interior magnet type rotary electric machine has been described. However, as in a rotor 30C shown in FIG. 12, a plurality of magnets 32C1 and 32C2 may be attached to the outer circumferential surface of an iron core 31C. In the rotor 30C, the arrangement of the magnets 32C1 included in a first row and the arrangement of the magnets 32C2 included in a second row are out of phase with each other in the circumferential direction, so that the rotor 30C has a discontinuous skew structure. When the rotor 30C shown in FIG. 12 is adopted, the same effect as in the above-described embodiments can be obtained.

Embodiment 5

In the above-described embodiment, a rotor having a row-to-row skew structure is illustrated. However, embodiments of the present invention are not limited thereto, and the present invention is also applicable to a rotor having an oblique skew structure.

Figure 13:
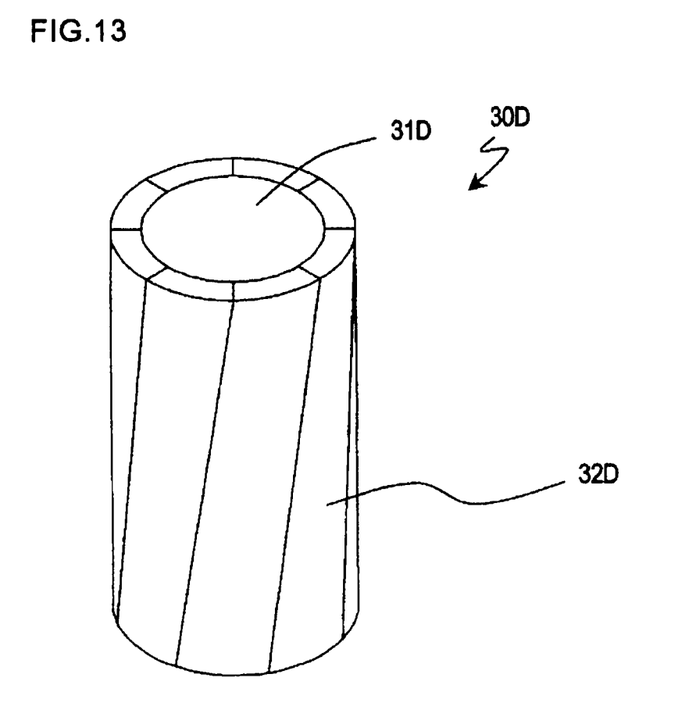
FIG. 13 schematically shows a perspective view of a rotor of a rotary electric machine according to Embodiment 5 of the present invention.

For example, the present invention is also applicable to a case where, as in a rotor 30D shown in FIG. 13, a magnet 32D has a linear oblique skew structure. In the rotor 30D of FIG. 13, a ring-shaped magnet 32D is attached to the outer circumference of the rotor iron core 31 D. In the magnet 32D, N-poles and S-poles alternate with each other in a rotor circumferential direction, and a boundary between the N-pole and the S-pole is formed obliquely in a straight line in the rotation axis direction. In the rotor 30D having such an oblique skew structure, magnetic flux leakage in the rotation axis direction occurs in various parts of the magnet 32D in the rotation axis direction. The largest amount of the magnetic flux leakage occurs at a central portion in the rotation axis direction. Accordingly, when a stator such as the stator 20A shown in FIGS. 1 and 3 having the auxiliary slots 24A at the central portions in the rotation axis direction is adopted as a stator for use in combination with the rotor 30D, the same effect as in the above-described embodiments can be obtained. That is, when the oblique skew structure is adopted, the entire length of the magnet 32D in the rotation axis direction corresponds to a change section of a rotor, and the center of the change section in the rotation axis direction is the center of the magnet 32D in the rotation axis direction.

When the number of magnetic poles included in the rotor is defined as m and the number of tooth sections included in the stator is defined as n, the theoretical skew angle of the rotary electric machine having the oblique skew structure is obtained based on the equation of the skew angle θ=[360/(the least common multiple of m and n)]/(k+1), where k=0. The skew angle of the rotary electric machine having the oblique skew structure is set at an angle which is either larger or smaller by a predetermined angle than the above-mentioned theoretical value as the reference angle. In each case, the present invention is applicable.

Figure 14:
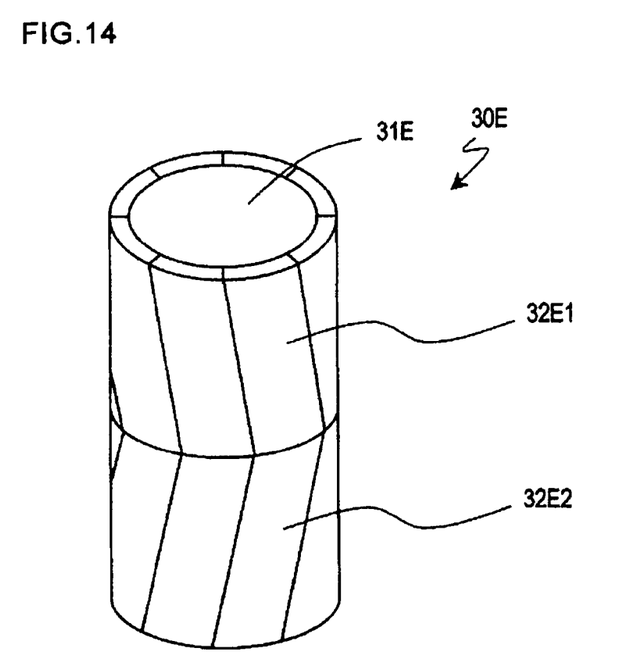
FIG. 14 schematically shows a perspective view of a rotor of a rotary electric machine according to Embodiment 5 of the present invention.

Furthermore, as the rotor 30E shown in FIG. 14, a rotor may have such a skew structure that an oblique skew structure and a row-to-row skew structure are combined. In this case, the boundary between a magnet 32E1 and a magnet 32E2 corresponds to a change section (boundary) of the row-to-row skew structure. Therefore, by using a stator such as the stator 20A shown in FIGS. 1 and 3 having the auxiliary slots 24A at the center thereof in the rotation axis direction, the same effect as described above can be obtained. Moreover, since each of the magnets 32E1 and 32E2 has the oblique skew structure, auxiliary slots may further be formed such that the center of each of the auxiliary slots in the rotation axis direction is opposed to the center of each of the magnets 32E1 and 32E2 in the rotation axis direction.

Embodiment 6

Figure 15:
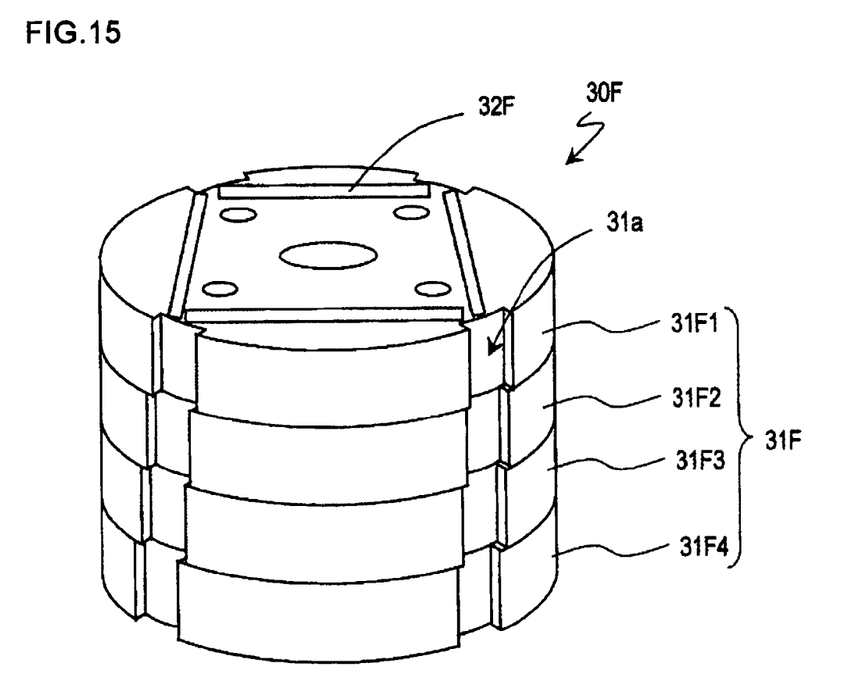
FIG. 15 schematically shows a perspective view of a rotor of a rotary electric machine according to Embodiment 6 of the present invention.

In the above-described embodiments, the case of the rotor having the row-to-row skew structure or the oblique skew structure is illustrated. However, embodiments of the present invention are not limited thereto, and the present invention is also applicable to a rotor having a so-called pseudo skew structure as shown in FIG. 15. In a rotor 30F shown in FIG. 15, a plurality of rows of iron cores 31F1 to 31F4 form a rotor iron core 31F, and one magnet sheet 32F is embedded within each of the iron cores 31F1 to 31F4. The structure and the arrangement of each of the magnets 32F are constant in the rotation axis direction. A notch 31a is provided near a boundary between magnetic poles on the outer circumference of each of the iron cores 31F1 to 31F4. The notch 31a is formed in each of the plurality of rows of the iron cores 31F1 to 31F4, in such a manner that the notches 31a are displaced from each other by a predetermined angle. That is, the notches 31a formed in the iron cores 31F1 to 31F4 provide a skew structure, and the rotor 30F has the so-called pseudo skew structure with four rows by means of the divided iron cores 31F1 to 31F4. Therefore, by using a stator in which three auxiliary slots are formed such that the center of each auxiliary slot in the rotation axis direction corresponds to each of the boundaries between the rows, the same effect as in the above-described embodiments can be obtained.

However, there is a problem that the pseudo row-to-row skew structure cannot reduce a torque ripple which occurs at the time of energization. Therefore, it is preferred to form a skew structure by means of the structure or the arrangement of a magnet.

In the configuration illustrated in the above-described embodiment, two auxiliary slots are provided in each tooth section of the stator, in the circumferential direction. However, the number of auxiliary slots provided in the circumferential direction may be determined so as to reduce the second harmonic component of the cogging torque. The number, the circumferential positions, and the like, of the auxiliary slots are disclosed in Patent Document 1 for example.

Industrial Applicability

The present invention is applicable generally to permanent magnet type rotary electric machines such as a servomotor.

The invention claimed is:
1. A rotary electric machine, comprising:
a rotor including
a rotor iron core,
permanent magnets which are arranged such that magnetic poles of N poles and S poles are arranged alternately with each other in a rotation circumferential direction of the rotor iron core and that the permanent magnets form a plurality of rows in a rotation axis direction of the rotor iron core, and a change section in which arrangements of the magnetic poles change with respect to the rotation axis direction due to the permanent magnets being arranged such that arrangements of the magnetic poles change, in the rotation circumferential direction, between the permanent magnets in the plurality of rows; and a stator including a plurality of tooth sections which are opposed to the rotor to surround the rotor, and auxiliary slots each of which is selectively formed at a front end portion of each tooth section in the rotation axis direction such that substantially a center of the auxiliary slot in the rotation axis direction is opposed to the change section, the front end portion including a face that extends continuously across the width of the front end portion from an edge of the front end portion to an edge of the auxiliary slot in the rotation axis direction.

2. The rotary electric machine according to claim 1, wherein the rotor has a change section in which arrangements of the magnetic poles change with respect to the rotation axis direction due to the permanent magnets being arranged such that the magnetic poles of the permanent magnets in the plurality of rows are displaced from each other by a predetermined angle in the rotation circumferential direction.

3. The rotary electric machine according to claim 2, wherein the predetermined angle is equal to or larger than [{360/(the least common multiple of m and n)}/(k+1)], where k represents the number of change sections, m represents the number of magnetic poles included in the rotor, and n represents the number of the tooth sections included in the stator.

4. The rotary electric machine according to claim 1, wherein the rotor has a change section in which arrangements of the magnetic poles change with respect to the rotation axis direction due to boundaries between the magnetic poles of the permanent magnets in the rows being obliquely formed in a straight line in the rotation axis direction and due to the permanent magnets being arranged such that an angle of obliquity of the boundaries between the magnetic poles with respect to the rotation axis direction is different among the permanent magnets in the plurality of rows.

5. The rotary electric machine according to claim 1, wherein a ratio between a length of the auxiliary slot in the rotation axis direction and a length of a portion in which no auxiliary slot is formed and which is located on an extension of the auxiliary slot in the rotation axis direction is set to reduce a second harmonic component of a cogging torque.

6. The rotary electric machine according to claim 5, wherein the ratio between the length of the auxiliary slot in the rotation axis direction and the length of the portion in which no auxiliary slot is formed and which is located on the extension of the auxiliary slot in the rotation axis direction is 1.3:1.0.

7. The rotary electric machine according to claim 1, wherein the permanent magnets in the respective rows are embedded in the rotor iron core.

8. The rotary electric machine according to claim 1, wherein the permanent magnets in the respective rows are attached to an outer circumference of the rotor iron core.

9. The rotary electric machine according to claim 1, wherein a ratio between the number m of the magnetic poles included in the rotor and the number n of the tooth sections included in the stator is 2:3.

10. The rotary electric machine according to claim 1, wherein the permanent magnets are arranged to form two rows in the rotation axis direction of the rotor iron core, and the rotor has a change section in which arrangements of the magnetic poles change with respect to the rotation axis direction due to the permanent magnets being arranged such that the magnetic poles of the permanent magnets in the two rows are displaced from each other by a predetermined angle in the rotation circumferential direction.

11. A rotary electric machine comprising:

a rotor including a rotor iron core, permanent magnets which are arranged such that magnetic poles of N poles and S poles are arranged alternately with each other in a rotation circumferential direction of the rotor iron core and that the permanent magnets form a plurality of rows in a rotation axis direction of the rotor iron core, and a change section in which arrangements of the magnetic poles change with respect to the rotation axis direction due to the permanent magnets being arranged such that arrangements of the magnetic poles change, in the rotation circumferential direction, between the permanent magnets in the plurality of rows; and a stator including a plurality of tooth sections which are opposed to the rotor to surround the rotor, and auxiliary slots each of which is selectively formed at a front end portion of each tooth section in the rotation axis direction such that substantially a center of the auxiliary slot in the rotation axis direction is opposed to the change section, wherein a second and a third auxiliary slot, each having a smaller width than that of the auxiliary slot, are formed at the front end portion at opposing extensions of the auxiliary slot in the rotation axis direction.

12. A rotary electric machine, comprising:

a rotor including a rotor iron core having a plurality of rows of iron cores in each of which permanent magnets are embedded such that magnetic poles of N poles and S poles are arranged alternately with each other, the iron core in each row having a notch at an outer circumferential portion thereof in which the magnetic poles change, the notch being formed such that the notch of one iron core is displaced from the notch of another iron core by a predetermined angle in a rotation circumferential direction; and a stator including a plurality of tooth sections which are opposed to the rotor to surround the rotor, and auxiliary slots each of which is selectively formed at a front end portion of each tooth section in a rotation axis direction such that substantially a center of the auxiliary slot in the rotation axis direction is opposed to a portion between the iron cores, the front end portion including a face that extends continuously across the width of the front end portion from an edge of the front end portion to an edge of the auxiliary slot in the rotation axis direction.

13. A rotary electric machine, comprising:

a rotor including a rotor iron core and permanent magnets which are arranged such that magnetic poles of N poles and S poles are arranged alternately with each other in a rotation circumferential direction of the rotor iron core and that boundaries between the magnetic poles are obliquely formed in a straight line in a rotation axis direction; and a stator including a plurality of tooth sections which are opposed to the rotor to surround the rotor, and auxiliary slots each of which is selectively formed at a front end portion of each tooth section in the rotation axis direction such that substantially a center of the auxiliary slot in the rotation axis direction is opposed to a central portion of the rotor in an axial direction of the rotor, the front end portion including a face that extends continuously across the width of the front end portion from an edge of the front end portion to an edge of the auxiliary slot in the rotation axis direction.

* * * * *